United States Patent [19]

White, Jr.

[11] 3,834,813

[45] Sept. 10, 1974

[54] DIAZO PRINTING SYSTEM

[75] Inventor: Russell P. White, Jr., Carrollton, Tex.

[73] Assignee: Haggar Company, Dallas, Tex.

[22] Filed: June 5, 1972

[21] Appl. No.: 260,007

Related U.S. Application Data

[62] Division of Ser. No. 80,829, Oct. 15, 1970.

[52] U.S. Cl. .................................... 355/50, 355/77

[51] Int. Cl. .......................................... G03b 27/48

[58] Field of Search ............ 355/77, 72, 71, 67, 50; 95/15

[56] References Cited

UNITED STATES PATENTS

| | | | |
|---|---|---|---|
| 1,966,261 | 7/1934 | Petit | 95/15 |
| 3,334,543 | 8/1967 | Perner | 355/71 |
| 3,512,887 | 5/1970 | Caraballo | 355/72 |
| 3,526,459 | 9/1970 | Elmer | 355/67 |
| 3,552,851 | 1/1971 | Gross | 355/77 |

*Primary Examiner*—John M. Horan
*Attorney, Agent, or Firm*—Richards, Harris & Medlock

[57] ABSTRACT

A diazo printing system comprises a source of ultraviolet radiation and an optical system including lenses that are transparent to ultraviolet radiation. The optical system directs radiation generated by the source through an intermediate, and focuses an enlarged or reduced image of the intermediate on a diazo layer. In accordance with the preferred embodiment of the invention, the diazo printing system is employed in a garment layout system that further includes a system for recording the image of an array of miniature garment patterns and thereby forming an optically enlargeable intermediate. The intermediate is employed in the diazo printing system to form a full size reproduction of the miniature patterns and the full size reproduction is employed in the cutting of cloth.

1 Claim, 5 Drawing Figures

DIAZO PRINTING SYSTEM

This is a division of application Ser. No. 80,829, filed Oct. 15, 1970.

BACKGROUND AND SUMMARY OF THE INVENTION

This invention relates to a diazo printing process, and more particularly to a diazo printing process that permits the enlargement or reduction of images and to a garment pattern layout system in which the image of miniature garment patterns is enlarged to form full size garment patterns.

In general, diazo printing involves the use of certain diazo compounds that exhibit the property of decomposing upon exposure to certain types of actinic radiation, particularly ultraviolet radiation. Upon decomposition, materials are produced which are essentially colorless and which remain colorless regardless of subsequent exposure to actinic or other radiation. On the other hand, if left unexposed, diazo compounds of the type used in diazo printing processes exhibit the additional property of combining with materials known as couplers to form intensely colored azo dyes. The azo dyes produced by diazo printing processes are virtually unaffected by subsequent exposure to actinic or other radiation, and thus form essentially permanent images.

Perhaps the most typical example of diazo printing is the "blueline" process that is used to form reproductions of engineering drawings, and the like. In accordance with the blueline process, a sheet of paper is coated with a diazo layer comprising a mixture of a selected diazo compound and a selected coupler. A drawing or other intermediate to be reproduced is positioned in direct contact with the diazo layer, after which the diazo layer is exposed to ultraviolet radiation directed through the intermediate. Following exposure, the diazo layer is developed by contact with an alkaline vapor to form a reproduction characterized by dark azo dye portions corresponding to the opaque portions of the intermediate and light non-dye portions corresponding to the transparent portions of the intermediate.

Because of the necessity of positioning the intermediate in contact with the diazo layer, diazo printing has heretofore been limited to processes in which the reproduction is the same size as the intermediate. That is, prior art diazo printing processes do not permit either the enlargement or the reduction of an image. Since the reproduction of miniature intermediates, such as microfilms, microfiches, etc., requires enlargement, prior art diazo printing processes are not suitable for use in document reproduction systems employing miniature intermediates. This is a decided disadvantage in that diazo reproduction is at least an order of magnitude less expensive than photographic reproduction.

It has been found that a combination of two factors is responsible for the difficulty encountered heretofore in attempting to adapt diazo printing to the reproduction of enlarged or reduced images. First, the outputs of most radiation sources contain relatively low percentages of ultraviolet radiation. Second, most lenses and optical systems tend to absorb, rather than to transmit ultraviolet radiation. Thus, when a conventional enlarging or reducing optical system is employed to focus the image of an intermediate on a diazo layer, the diazo layer receives insufficient ultraviolet radiation for proper exposure.

The present invention comprises a diazo printing system including a source of ultraviolet radiation and an optical system that is highly transparent to ultraviolet radiation. The optical system directs ultraviolet radiation from the source to an intermediate, and focuses ultraviolet radiation transmitted by the intermediate on a diazo layer. Depending on the nature and the positioning of the components of the optical system, the image that is focused on the diazo layer may comprise either an enlargement or a reduction of the intermediate.

In accordance with the preferred embodiment of the invention, the foregoing diazo printing system is utilized in a garment pattern layout system. Heretofore, systems for laying out garment patterns have involved a number of tedious manual steps. For example, in a typical system, a skilled technician arranges miniature garment patterns so as to obtain maximum cloth utilization. Then, using a photograph of the miniature patterns as a guide, other workers arrange full size garment patterns on a sheet of paper. The outlines of the full size patterns are then traced on the paper, and the resulting pattern is employed in the cutting of cloth.

The present garment layout system differs from prior systems in that after the miniature patterns are arranged, the image of the miniature patterns is recorded to form an intermediate. The intermediate is employed in a diazo printing system to form a full size reproduction of the miniature patterns, and the full size reproduction is employed in the cutting of cloth. Thus, once the miniature patterns are arranged, a full size pattern is generated without additional manual steps.

DESCRIPTION OF THE DRAWINGS

A more complete understanding of the invention may be had by referring to the following detailed description when taken in conjunction with the drawings, wherein.

DETAILED DESCRIPTION

Figures 1, 2:
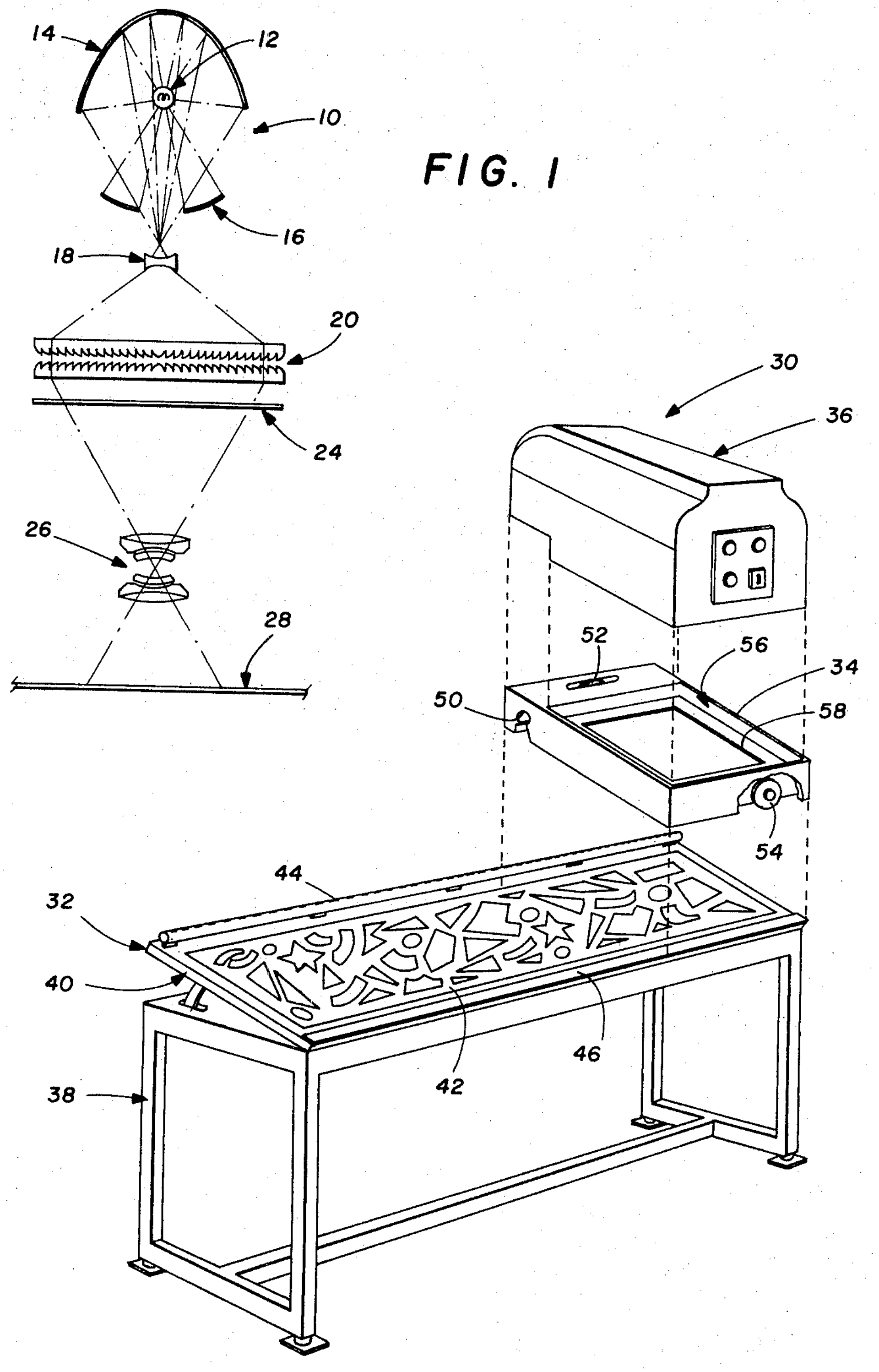
FIG. 1 is a schematic illustration of a diazo printing system incorporating the present invention.
FIG. 2 is an exploded view of a recording system comprising a portion of a garment layout system.

Referring now to the drawings, and particularly to FIG. 1 thereof, a diazo printing system 10 incorporating the present invention is schematically illustrated. The diazo printing system 10 includes a source of ultraviolet radiation 12, such as a mercury vapor lamp. Radiation from the source 12 is concentrated by an ellipsoidal mirror 14 positioned on one side of the source 12 and a spherical mirror 16 positioned on the opposite side. The ellipsoidal mirror 14 preferably comprises a dichroic mirror of the type that passes infrared radiation and reflects ultraviolet radiation. The use of such a mirror in the diazo printing system 10 is advantageous in that most of the heat generated by the source 12 is transmitted out of the system, and distortion of the remaining components of the system is therefore reduced.

Ultraviolet radiation reflected from the ellipsoidal mirror 14 is directed through a negative lens 18 to a condenser lens system 20. The condenser lens system 20 directs the radiation through an intermediate 22 to a projection lens system 24, which in turn focuses radiation transmitted by the intermediate 22 on an ultraviolet radiation sensitive surface 26. The projection lens system 24, the condenser lens system 20 and the negative lens 18 of the diazo printing system 10 are preferably constructed from materials that are highly transparent to ultraviolet radiation. For example, the projection lens system 24 may comprise one of the lens systems sold by Nikon, Inc. under the trademark "FAX-NIKKOR," and the condenser lens system 20 may comprise a matched pair of fresnel lenses of the type sold by Edmund Scientific Corp. It will be understood that the diazo printing system 10 can be operated without the negative lens 18 by simply changing the positioning of the condenser lens system 20, the intermediate 22, the projection lens system 24 and the surface 26 relative to the source 12.

In use, the diazo printing system 10 is employed to transfer an image from the intermediate 22 to the ultraviolet radiation sensitive surface 26. The intermediate 22 comprises a sheet having portions transparent to ultraviolet radiation and portions opaque to ultraviolet radiation which in combination form the image to be reproduced. For example, the intermediate 22 may comprise a photographically prepared transparency provided that the medium upon which the transparency is formed is transparent to ultraviolet radiation. Thus, photographic transparencies of the polyester base type may be employed as the intermediate 22 whereas photographic transparencies of the acetate base type may not, since acetate attenuates ultraviolet radiation.

The surface 26 may comprise a layer of any material that is sensitive to ultraviolet radiation. However, in accordance with the preferred embodiment of the invention, the surface 26 comprises the light sensitive surface of a sheet of conventional diazo printing paper. This material is advantageous in the use of the present invention in that it is inexpensive to purchase, and in that it is relatively insensitive to ordinary visible light. This permits the storage of the paper in cabinets that are not entirely light-proof.

In accordance with the preferred embodiment of the invention, the diazo printing system 10 is employed in a garment layout system of the type illustrated in FIGS. 2, 3, 4 and 5. As is best shown in FIG. 2, the garment layout system includes a pattern recording system 30 comprising a layout table 32, a carriage 34, and a camera 36. In the use of the recording system 30, a plurality of miniature garment patterns 38 are positioned on the layout table 32 by a technician skilled in the arrangement of garment patterns to obtain maximum cloth utilization. Thereafter, the camera 36 and the carriage 34 are employed to form an intermediate comprising the image of the miniature patterns 38 on the layout table 32.

More particularly, the layout table 32 includes a base 40 and an easel 42 that is supported on the base 40 for movement between a plurality of angular positions. The easel 42 comprises a pattern layout surface 44, a rack 46 extending along one side of the layout surface 44, and a flat rail 48 extending along the other side. In accordance with the preferred embodiment of the invention, the layout surface 44 comprises a sticky or tacky substance and receives miniature patterns 38 formed from thin, stiff sheets of plastic. The miniature patterns 38 may be positioned on the layout surface 44 by means of vacuum tweezers, if desired.

The carriage 34 of the recording system 30 includes a passageway 50 which normally receives the rack 46 of the layout table 32, and a gear 52 which normally engages the teeth of the rack 46. A pair of wheels 54 (only one of which is shown) are mounted in the opposite end of the carriage 34 for engagement with the flat rail 48 of the layout table 32. The central portion of the carriage 34 comprises a camera receiving cavity 56 having an aperture 58 formed through it.

Figures 3, 4:
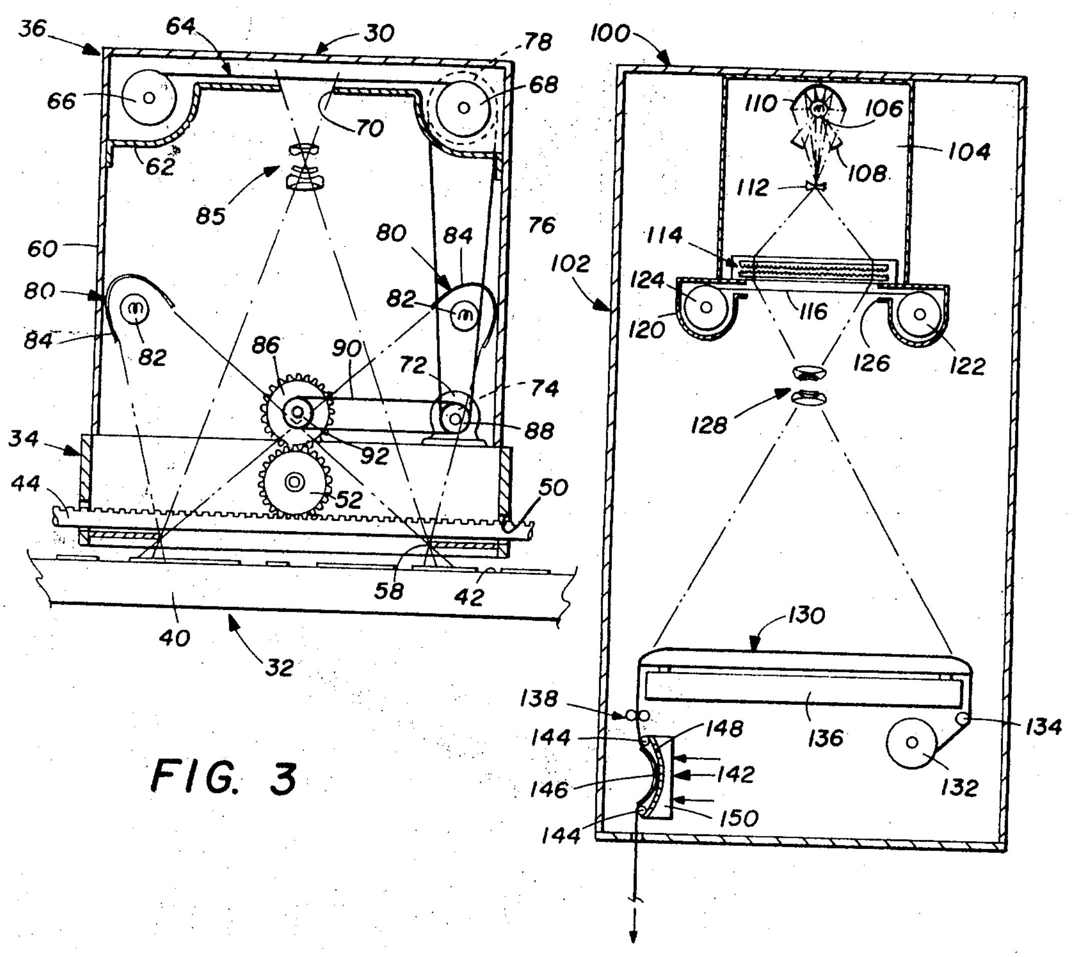
FIG. 3 is a sectional view illustrating the operation of the recording system shown in FIG. 2.
FIG. 4 is a sectional view illustrating the construction and operation of an enlarging and developing system comprising a portion of a garment layout system.

The structural details of the camera 36 of the recording system 30 are best shown in FIG. 3. The camera 36 includes a housing 60 which encloses a magazine 62. A length of film 64 extends through the magazine 62 from a supply reel 66 to a take-up reel 68. The magazine 62 has an aperture 70 formed through it, and the length of film 64 is advanced across the aperture 70 by an electric motor 72 which rotates the take-up reel 68 through a pulley 74 secured to the motor 72, a toothed belt 76, and a pulley 78 secured to the take-up reel 68.

The housing 60 of the camera 36 also encloses a pair of radiation generators 80 each including a radiation source 82 and a reflector 84. The radiation generators 80 direct radiation through the aperture 58 formed in the carriage 34 onto the layout surface 44 of the easel 42 and the miniature patterns 38 positioned thereon. Radiation striking the miniature patterns 38 is reflected through a set of projection lenses 85 and through the aperture 70 formed in the housing 60. By this means, the image of the patterns 38 on the surface 44 are transferred to the length of film 64.

In the use of the camera 36, the length of film 64 is moved continuously through the magazine 62, and the carriage 34 is continuously driven along the rack 46 of the layout table 32 in timed relation to the movement of the length of film 64 through the magazine 62. The carriage 34 is driven by the motor 72 which drives a gear 86 through a pulley 88, a toothed belt 90, and a pulley 92. The gear 86 meshes with the gear 52 mounted in the carriage 34, and the gear 52 in turn meshes with the rack 46 of the table 32, so that upon operation of the motor 72, the carriage 34 and the camera 36 are moved relative to the table 32.

The nature of the film 64 is not critical to the operation of the camera 36 so long as the film is sensitive to the radiation produced by the radiation generators 80. For example, the film 64 may comprise photographic film, in which case the radiation generators 80 are equipped with sources 82 comprising ordinary photoflood lamps. In such a case, the film 64 is developed by conventional photographic developing techniques. Alternatively, the film 64 may comprise a web coated with a material that is rendered conductive when exposed to light. In such a case, the film 64 is developed by conventional xerographic techniques. In accordance with the preferred embodiment of the invention, the film 64 comprises a web of polyester material that is coated with a diazo layer of the type commonly employed in diazo printing papers and the like. Such a layer is sensitive to ultraviolet radiation, and accordingly, when a diazo layer comprises the sensitive portion of the film 64, the sources 82 of the radiation generators 80 preferably comprise either mercury vapor lamps or pulsed xenon lamps. After exposure in the camera 36, a length of film 64 including a diazo layer may be developed by conventional diazo printing developing techniques, which typically include subjecting the diazo layer to an alkaline atmosphere.

The nature of the upper surfaces of the miniature garment patterns 38 and the layout surface 44 is also not critical to the practice of the invention, provided that the patterns 38 and the surface 44 are differentiated in the radiation that is reflected to the film 64. For example, the recording system 30 may be constructed in such a way that radiation from the sources 82 is reflected from the patterns 38 and is absorbed by the surface 44. Conversely, the radiation may be reflected from the surface 44 and absorbed by the patterns. Also, the patterns 38 may bear fixed information, such as size, etc., and/or variable information, such as lot number, etc., if desired.

From the foregoing, it will be understood that the function of the recording system 30 is to form the image of an array of miniature garment patterns. The miniature patterns employed in many prior art garment layout systems are one-fifth scale and, in such a case, the image may conveniently comprise a one-to-one recording of the miniature patterns. Of course, the image may be either larger or smaller than the miniature patterns, if desired. All that is necessary to the practice of the invention is the generation of an intermediate which bears the image of the miniature patterns in the form of relatively transparent portions and relatively opaque portions.

Referring now to FIG. 4, the garment layout system further includes an enlarging and developing system 100. The system 100 comprises a housing 102 which encloses a printing system 104. The printing system 104 may comprise a conventional photographic printing system or a conventional xerographic printing system. However, in accordance with the preferred embodiment of the invention, the printing system 104 comprises a diazo printing system constructed similarly to the diazo printing system 10 shown in FIG. 1.

When a diazo printing system is employed in the enlarging and developing system 100, the printing system 104 comprises a mercury vapor lamp 106, a spherical mirror 108, and a dichroic ellipsoidal mirror 110. Ultraviolet radiation generated by the mercury vapor lamp 106 is reflected from the ellipsoidal mirror 110 through a negative lens 112 and through a pair of condenser lenses 114 to an intermediate 116. The intermediate 116 is mounted in a magazine 120 and is supported on a supply reel 122 and a take-up reel 124 for movement across an aperture 126. The intermediate 116 comprises the developed form of a length of film such as that which was exposed in the camera 36, and bears the images of the miniature patterns 38 in the form of portions transparent to ultraviolet radiation and portions opaque to ultraviolet radiation.

Ultraviolet radiation transmitted through the intermediate 116 passes through a set of projection lenses 128 which focus the radiation on a web of conventional diazo printing paper 130. The web of diazo paper 130 extends from a supply reel 132 over a guide roller 134 and across a projection table 136 to a pair of pinch rollers 138. The pinch rollers 138 transport the web of diazo printing paper 130 across the projection table 136 in sychronism with the movement of the intermediate 116 across the aperture 126. Thus, the printing system 104 operates to transfer the images of the miniature patterns 38 from the intermediate 116 to the web of diazo printing paper 130.

The lenses 112, 114 and 128 of the printing system 104 are preferably formed from materials that are highly transparent to ultraviolet radiation. For example, the lenses 128 may be of the type sold by Nikon, Inc. under the trademark "FAX-NIKKOR," and the lenses 114 may be plastic fresnel lenses of the type sold by Edmund Scientific Corp. When lenses that are highly transparent to ultraviolet radiation are employed in the printing system 104, sufficient radiation is transmitted through the transparent portions of the intermediate 116 to decompose the corresponding portions of the diazo layer of the web of diazo printing paper 130 in a rapid and efficient manner.

From the pinch rollers 138, the web of diazo printing paper 130 passes through a developing station 142. The developing station 142 includes a pair of guide rollers 144 and a guide plate 146 which direct the web 130 across a plastic plate 148 having a multiplicity of holes formed through it. The rear of the plate 148 is surrounded by a housing 150 which receives predetermined quantities of anhydrous ammonia and water vapor. These gases mix within the housing 150 to form ammonium hydroxide, and the ammonium hydroxide reacts with the unexposed portions of the diazo layer on the web of diazo printing paper 130 to form a permanent azo dye. Thus, after passing through the developing station 142, the web of diazo printing paper 130 bears a visible reproduction of the arrangement of miniature patterns that was previously formed on the layout table 32.

It will be understood that the nature of the developing station 142 of the enlarging and developing station 100 depends entirely on the nature of the sensitized printing media employed in the system 100. Thus, certain commercially available diazo and other printing papers are so formulated that they are developed upon exposure to heat. If such a paper is employed in the enlarging and developing system 100, the developing station 142 comprises a heating station. Similarly, the printing paper manufactured by E. I. du Point de Nemours and Company, Incorporated, and sold under the trademark "DYLUX" is self developing after exposure to ultraviolet radiation. When such a material is employed in the enlarging and developing system 100, the developing station 142 is eliminated altogether.

In accordance with the preferred embodiment of the invention, the component parts of the printing system 104 are selected and arranged in such a way that the image of the miniature patterns 38 on the intermediate 116 is enlarged to full size in the operation of the printing system 104. Thus, in the case of one-fifth scale patterns and an intermediate comprising a one-to-one recording of the patterns, the printing system 104 is designed to produce a magnification of five-to-one. Of course, such an arrangement requires the operation of the pinch rollers 138 in transporting the web of diazo printing paper 130 at a speed five times faster than the operation of the take-up reel 24 in transporting the intermediate 116.

Figure 5:
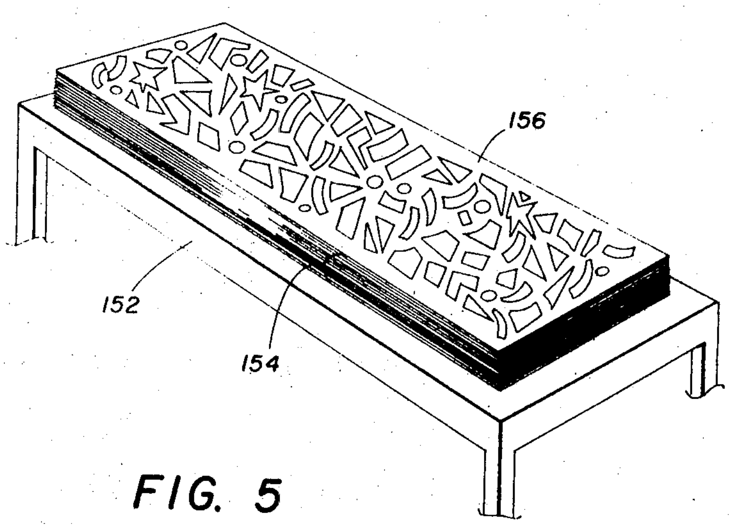
FIG. 5 is a perspective view illustrating the result of the use of the garment layout system.

Referring now to FIG. 5, there is shown a conventional cutting table 152 which supports a multiplicity of layers of cloth 154. A pattern 156 generated by the foregoing garment layout system and comprising a full size reproduction of an arrangement of miniature garment patterns 38 is positioned over the layer of cloth 154. Then, the layers of cloth are cut in accordance with the pattern 156 by a conventional electric knife (not shown). The cloth segments so produced are then sewn together into garments.

Those skilled in the art will immediately be aware that the diazo printing system shown in FIG. 1 is capable of a variety of uses in addition to the garment layout system shown in FIGS. 2 through 5. For example, the diazo printing system can be employed to form full size reproductions from miniature intermediates, such as microfilms, microfiches, and the like. The diazo printing system may also be employed to form full size reproductions of engineering drawings originally prepared in reduced scale. This is particularly advantageous in the aircraft and shipbuilding industries, wherein the storage of extremely large drawings often requires a great volume of space. Another use for the diazo printing system comprises graphic arts proofing. This use is advantageous in that it reduces the cost of preparing proofs, and in that it reduces the time and complexity involved in the development of proofs.

Those skilled in the art will also be aware that the garment layout system illustrated in FIGS. 2–5 is not limited to the mechanisms shown. For example, it is presently believed that it may be possible to employ computer techniques to arrange miniature patterns. With the advent of computer based miniature pattern arranging systems, it may be possible to generate intermediates suitable for use in the enlarging and developing system shown in FIG. 4 with using the recording system shown in FIGS. 2 and 3.

From the foregoing, it will be understood that the present invention comprises a diazo printing system including a source of ultraviolet radiation and an optical system for directing ultraviolet radiation from the source through an intermediate and onto a diazo layer. The optical system preferably comprises components that are highly transparent to ultraviolet radiation. In accordance with the preferred embodiment of the invention, the diazo printing system comprises a portion of a garment layout system in which the images of miniature garment patterns are recorded to form an intermediate, and in which the intermediate is employed to form full size reproductions of the garment patterns.

Although a particular embodiment of the invention has been illustrated in the drawings and described herein, it will be understood that the invention is not limited to the embodiment disclosed, but is capable of rearrangement, modification and substitution of parts and elements without departing from the spirit of the invention.

What is claimed is:

1. A garment pattern layout system including:

a layout table having a surface for receiving an array of miniature garment patterns;

said miniature garment pattern receiving surface comprising means for retaining the miniature garment patterns thereon;

a camera receiving carriage mounted for movement along the miniature garment pattern receiving surface of the layout table;

cooperating guide means on the layout table and the carriage for guiding the carriage along a path extending over the miniature garment pattern receiving surface of the table;

cooperating drive means on the layout table and the carriage for moving the carriage along the entire length of the miniature garment pattern receiving surface of the layout table;

a camera mounted on the carriage and including means for focusing radiation reflected from the surface and from the miniature garment patterns received thereon onto a length of intermediate forming film and thereby exposing the film, said intermediate forming film being of substantially reduced dimensions relative to an array of full size garment patterns;

said camera further including motor means for actuating the drive means of the carriage and the layout table to advance the carriage and the camera along the miniature garment receiving surface of the layout table and for advancing the intermediate forming film in synchronism with the movement of the carriage and the camera so that an image of the array of miniature garment patterns on the surface of the layout table is formed on the intermediate forming film in the camera, said image being of substantially reduced dimensions relative to an array of full size garment patterns;

a projector having means for generating a beam of ultraviolet radiation;

means for moving the intermediate comprising the image of the miniature garment patterns through the beam of ultraviolet radiation at a predetermined rate; radiation means for optically enlarging the image of the miniature garment patterns on the intermediate and for focusing a full size reproduction of the array of miniature garment patterns on a predetermined plane; and means for moving a sheet of diazo printing paper across the predetermined plane in synchronism with the movement of the intermediate through the beam of ultraviolet radiation and thereby printing an array of full size garment patterns on the diazo printing paper.

* * * * *

UNITED STATES PATENT OFFICE
CERTIFICATE OF CORRECTION

Patent No. 3,834,813 Dated September 10,1974

Inventor(s) Russell P. White, Jr.

It is certified that error appears in the above-identified patent and that said Letters Patent are hereby corrected as shown below:

In the drawings, Sheet 1, Figure 1, the reference numeral "24" should read --22--. The reference numeral "26" should read --24--. The reference numeral "28" should read --26--.

In the drawings, Sheet 1, Figure 2, reference numeral "38" should read --40--. Reference numeral "40" should read --42--. Reference numeral "42" should read --44--. Reference numeral "44" should read --46--. Reference numeral "46" should read --48--. The garment patterns positioned on top of easel 42 should be identified by reference numeral --38--.

Signed and sealed this 6th day of May 1975.

(SEAL)
Attest:

RUTH C. MASON
Attesting Officer

C. MARSHALL DANN
Commissioner of Patents and Trademarks